Patented Aug. 4, 1931

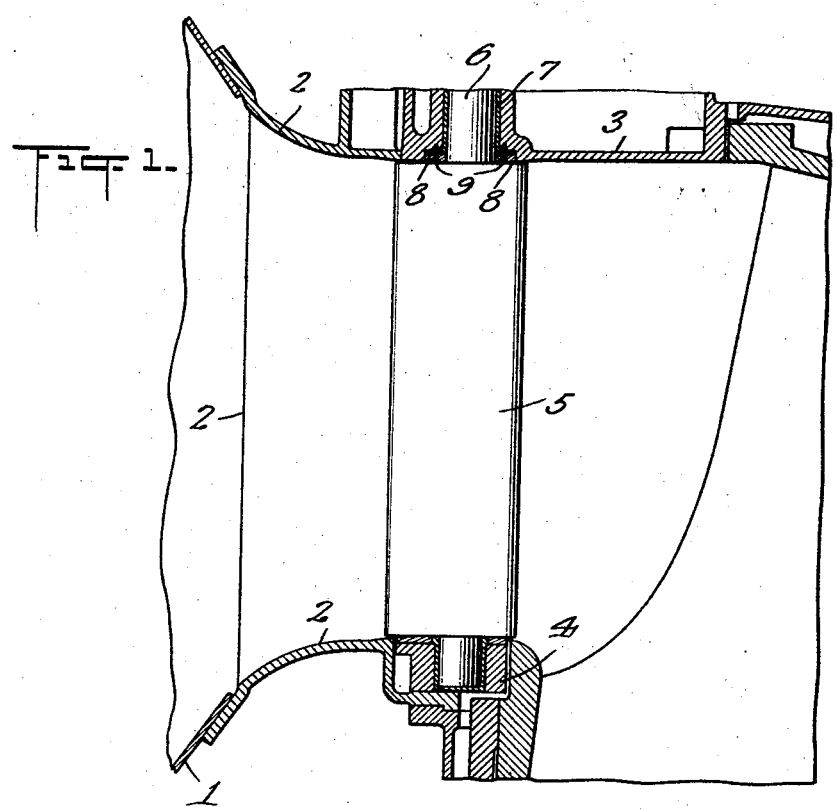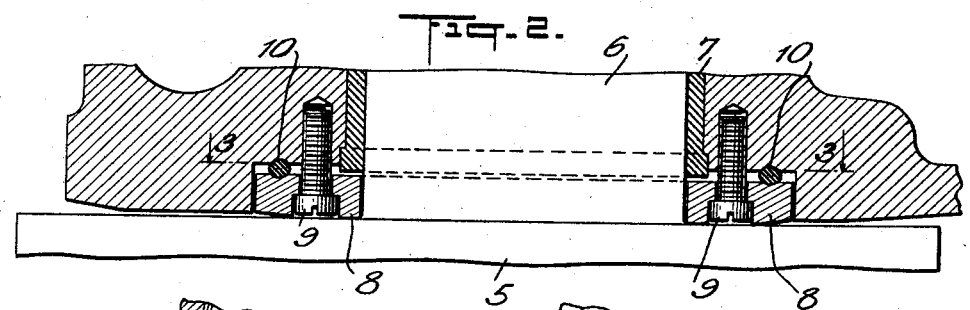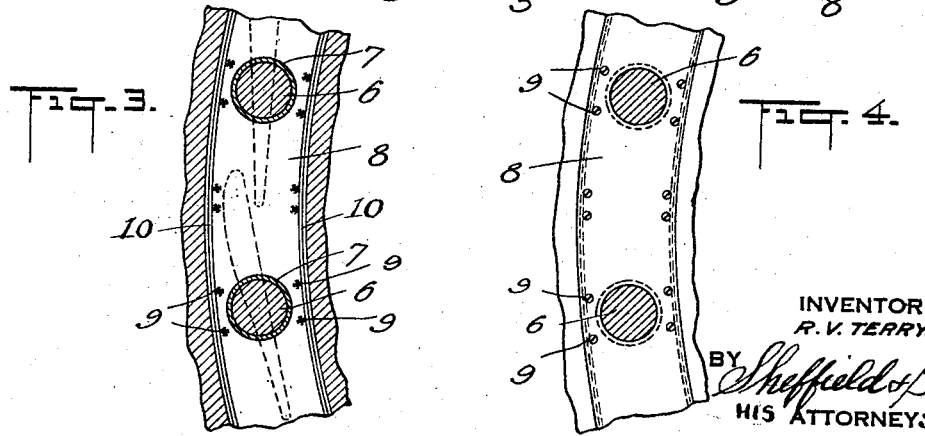

1,817,654

UNITED STATES PATENT OFFICE

ROGER V. TERRY, OF HILTON VILLAGE, VIRGINIA, ASSIGNOR TO NEWPORT NEWS SHIPBUILDING AND DRY DOCK COMPANY, A CORPORATION OF VIRGINIA

ADJUSTABLE SEAL FOR HYDRAULIC TURBINE GATES AND THE LIKE

Application filed August 27, 1930. Serial No. 478,141.

This invention relates to hydraulic turbines having various forms of rotating parts or runners which are usually disposed in a horizontal position so that appropriate power transmitting apparatus may be attached to the upper ends of the shafts on which they rotate and is particularly concerned with the gates which control the flow of water to the turbine runner.

As is fully appreciated by engineers having the design of hydraulic turbines, it is particularly desirable that the wicket gates, which control the flow of the water to the turbine, shall fit the turbine casing as accurately as possible when closed, in order to prevent the leakage and waste of water through the gates when the turbine is not in operation. It is, therefore, one of the objects of the present invention to eliminate this leakage or waste of water to a large extent without materially complicating the structure of the turbine itself.

When the usual turbine construction is followed, it is necessary for mechanical reasons, to provide a clearance at the ends of the wicket gate blades or members so that when the gates are in position in the turbine casing, they will rotate freely without a binding action produced by friction with the crown plate and the curb or lower distributor plate.

There are several causes which produce inaccuracies in the construction of the gates and casings of turbine units, which inaccuracies are very difficult to remedy after the turbine has been assembled and installed in its operative position. One of these causes results from the various inaccuracies in machining the parts and other operations due to unavoidable and slight differences in shop practice.

Another cause of unforeseen difficulties in the final assembly of a turbine is due to the indeterminate amounts of deflection in the component parts of a turbine, owing to the superimposed weights sustained by those parts when the turbine is finally installed on the foundation in the power house. It is, therefore, usually necessary to provide more clearance at the ends of the gates than would seem to be required in the design of a turbine, to prevent an undesirable binding action.

The object, therefore, of the present invention is to provide a simple inexpensive and easily constructed means for adjusting the parts which determine the space between the ends of the gates and the turbine casing, so that the clearance between said parts after final installation of the turbine may be easily adjusted and fixed to substantially prevent leakage without any binding action.

For a detailed description of one form of my invention which I at present deem preferable, reference may be had to the following specification and to the accompanying drawings, forming a part thereof, in which Fig. 1 is a vertical, sectional view of a portion of the intake of a hydraulic turbine showing the position of the wicket gate and the relation of my improvements thereto.

Fig. 2 is an enlarged cross-section, substantially similar to a portion of Fig. 1, showing the principal parts constituting my improvements more in detail.

Fig. 3 is a horizontal, sectional view taken substantially on the line 3—3 of Fig. 2; and Fig. 4 is a bottom view, showing the trunnions in sections.

Referring to the drawings, the numeral 1 indicates a portion of the feed conduit or spiral casing of an hydraulic turbine unit. The numeral 2 indicates the intake portion of the turbine casing often called the "speed ring", 3 indicates the crown plate, and 4 the lower distributor or curb plate. One of the wicket gates is indicated by the numeral 5 and its general outline and position is shown in Fig. 3 by dot and dash lines. In general all of these parts are of the customary construction adopted in building hydraulic turbines. However, in accordance with my invention the crown plate or head cover 3 is recessed adjacent to the bearings or trunnions 6 of the wicket gates 5, as will be hereinafter explained. The numeral 7 indicates a bearing bushing in which the wicket gate bearings rotate to control the admission of water to the turbine. Within the recesses in the crown plate above referred to, is an annular ring 8 which extends around the turbine runner within the crown plate and may be made in one or more pieces, as is desired. This ring or the sections thereof are drilled or bored to fit over the stems or bearings 6 of the wicket gates 5. The ring 8 or the sections thereof are preferably retained in position by cap screws, bolts or similar devices 9 which pass through said ring and enter said crown plate. Between the ring 9 and the bottom of the recess in which it is contained, there is placed two or more pieces or strips of packing material 10, which are preferably composed of round rubber cord or flexible fabric covered with rubber. This packing material forms a seal between the annular ring 8 and the crown plate 3 and being elastic also serves to force the ring 8 outward against the heads of the cap screws or bolts 9. The packing being elastic or flexible also allows the screws 9 to be turned inward to such a position that the ring will be held within the recess at the desired point. The packing is preferably fixed in position by providing corresponding annular grooves in the crown plate and in the ring respectively, although I do not consider the same entirely essential or necessary.

The turbine embodying the above mentioned features of my invention is installed in the customary manner, the vertical position of the wicket gates being brought about by the customary means so that the lower ends will just clear the lower distributor plate 4 and the upper ends of the crown plate 3. The position of the annular ring 8 is then adjusted by means of the cap screws or bolts 9 so that it will just clear the upper ends of the wicket gates without leaving any unnecessary space. This will prevent the gates from binding, thereby producing friction, and will at the same time prevent unnecessary leakage by reducing the clearance between the wicket gates and the crown plate to a minimum.

The above description applies particularly to a turbine which shows my improvements applied to one end of the wicket gates only. In certain cases it may be found desirable to employ this invention at both ends of the wicket gates in which case a similar arrangement can be provided adjacent the bearings of the wicket gates in the curb plate.

I do not wish it to be understood that the use of this invention is limited to turbines of the type illustrated in the drawings nor is it to be limited to use in hydraulic turbines exclusively, for an engineer skilled in the art could understand that the same may be applied to pumps and other hydraulic devices where it is desired to limit the leakage of a fluid to a minimum amount between stationary and rotating parts.

Having thus described my invention, what I desire to secure and protect by Letters Patent is:

1. In an hydraulic turbine or similar device having gates of the pivoted type and having bearings entering the crown plate, the improvement providing means for adjusting the clearance at the ends of the gates, which comprises a non-resilient ring on the crown plate through which the adjacent bearings of said gates pass, resilient devices for forcing said ring outward and adjustable retaining members engaging said ring to hold the same in position and to determine the amount of clearance between said gates and said ring.

2. In an hydraulic turbine or similar device having gates of the pivoted type, the improvement providing means for adjusting the clearance at the ends of the gates, which comprises a plate having an annular recess surrounding the ends of said gates, an annular ring in said recess and having openings therein for the gate bearings, resilient rubber packing between said ring and the bottom of said recess and adjustable retaining members engaging said ring and said plate to hold said ring in position and to determine the amount of clearance between said gates and said ring.

3. In an hydraulic turbine or similar device, a casing having wicket gates of the pivoted type and a crown plate, the improvement which comprises, providing an annular recess in said crown plate, an annular ring in said recess, and adjustable means engaging said ring and crown plate and arranged so that the position of the latter with respect to the gates may be conveniently adjusted after installation of the turbine to determine the clearance between said crown plate and the ends of the gates.

4. In an hydraulic turbine or similar device, a casing having wicket gates of the pivoted type and a crown plate, the improvement which comprises, providing an annular recess in said crown plate opposite the ends of said gates, an annular ring in said recess, resilient material between said ring and the bottom of said recess, said crown plate and said ring being grooved concentrically on their adjacent surfaces to hold said resilient material in position, and bolts passing through said ring and entering said crown plate for adjustably securing successive portions of said annular ring to the crown plate, whereby the clearance between the ends of said gates and the annular ring may conveniently be adjusted to provide the desired clearance after installation of the turbine.

Signed this 20th day of August, 1930.

ROGER V. TERRY.